(12) United States Patent
Velayuthaperumal

(10) Patent No.: US 10,534,751 B1
(45) Date of Patent: Jan. 14, 2020

(54) METADATA SPACE EFFICIENT SNAPSHOT OPERATION IN PAGE STORAGE

(71) Applicant: Seagate Technology LLC, Cupertino, CA (US)

(72) Inventor: Gomathirajan Authoor Velayuthaperumal, Bangalore Karnataka (IN)

(73) Assignee: Seagate Technology LLC, Cuptertino, CA (US)

(*) Notice: Subject to any disclaimer, the term of this patent is extended or adjusted under 35 U.S.C. 154(b) by 0 days.

(21) Appl. No.: 16/127,372

(22) Filed: Sep. 11, 2018

(51) Int. Cl.
| | |
|---|---|
| *G06F 11/14* | (2006.01) |
| *G06F 16/11* | (2019.01) |
| *G06F 3/06* | (2006.01) |
| *G06F 16/13* | (2019.01) |
| *G06F 16/907* | (2019.01) |

(52) U.S. Cl.
CPC .......... *G06F 16/128* (2019.01); *G06F 3/0604* (2013.01); *G06F 3/0643* (2013.01); *G06F 3/0671* (2013.01); *G06F 16/13* (2019.01); *G06F 16/907* (2019.01); *G06F 11/1456* (2013.01)

(58) Field of Classification Search
None
See application file for complete search history.

(56) References Cited

U.S. PATENT DOCUMENTS

| | | | |
|---|---|---|---|
| 6,732,171 B2 | 5/2004 | Hayden | |
| 6,839,706 B2 | 1/2005 | Spiers et al. | |
| 7,200,664 B2 | 4/2007 | Hayden | |
| 7,593,973 B2 | 9/2009 | Lee | |
| 7,783,603 B2 | 8/2010 | Wayda et al. | |
| 8,001,345 B2 | 8/2011 | Wayda et al. | |
| 8,656,123 B2 | 2/2014 | Lee | |
| 8,990,542 B2 | 3/2015 | Davies | |
| 2003/0028731 A1 | 2/2003 | Spiers et al. | |
| 2006/0080362 A1 | 4/2006 | Wagner et al. | |
| 2006/0080515 A1 | 4/2006 | Spiers et al. | |
| 2006/0277383 A1 | 12/2006 | Hayden et al. | |
| 2008/0114951 A1* | 5/2008 | Lee | G06F 11/1469 711/162 |
| 2008/0256311 A1 | 10/2008 | Lee | |
| 2009/0210875 A1 | 8/2009 | Bolles et al. | |
| 2009/0307450 A1* | 12/2009 | Lee | G06F 3/0605 711/162 |

* cited by examiner

*Primary Examiner* — Brian R Peugh
(74) *Attorney, Agent, or Firm* — Kagan Binder, PLLC

(57) ABSTRACT

A method includes accessing a first top level entry of a first table of the base volume, the first top level entry having at least a first bottom level entry. The method also includes receiving a first request for a metadata snapshot of the base volume, including the first bottom level entry. The method also includes generating a second top level entry of the first table, the second top level entry configured to point to the at least first bottom level entry of the first table, and the second top level entry configured to operate as a first snapshot of the first table including the at least first bottom level entry.

20 Claims, 7 Drawing Sheets

METADATA SPACE EFFICIENT SNAPSHOT OPERATION IN PAGE STORAGE

BACKGROUND

The present disclosure relates to improvements to management of metadata for use in computer storage systems. In more detail, the present disclosure relates to snapshot operations related to a data volume.

In current practice, metadata is accessed and read from time to time. When the metadata is accessed, a "snapshot" of relevant metadata can be produced and stored electronically. The metadata can include a top level page table with at least one top level entry, e.g., a base volume, and one or more metadata bottom level entries, which can include the snapshot of the base volume. In order to capture all relevant metadata, when producing a snapshot of a top level entry (base volume), each bottom level entry of the base volume is duplicated in the snapshot process for the top level entry. In other words, at present, a snapshot actually allocates duplicate metadata of the base volume, when the snapshot of the base volume is produced. This creates unnecessary and redundant duplication of data, leading to storage inefficiencies.

SUMMARY

According to a first aspect of the present disclosure, a method of managing metadata entries related to a base volume is disclosed. According to the first aspect, the method includes accessing a first top level entry of a first table of the base volume, the first top level entry having at least a first bottom level entry. The method also includes receiving a first request for a metadata snapshot of the base volume, including the first bottom level entry. The method also includes generating a second top level entry of the first table, the second top level entry configured to point to the at least first bottom level entry of the first table, and the second top level entry configured to operate as a first snapshot of the first table including the at least first bottom level entry.

According to a second aspect of the present disclosure, another method of managing metadata entries is disclosed. According to the second aspect, the method includes accessing a first top level entry of a first table, the first top level entry having at least a first bottom level entry. The method also includes receiving a first request for a metadata snapshot of the base volume, including the first bottom level entry. The method also includes receiving an indication that the first bottom level entry has been modified. The method also includes generating a second top level entry of the first table, the second top level entry configured to operate as a first snapshot of the first table including at least the first bottom level entry, the second top level entry operating to copy and the first bottom level entry to be stored in association with the second top level entry.

According to a third aspect, a system is disclosed. According to the third aspect, the system includes a hardware processor operatively coupled to a storage device. According to the third aspect, the hardware processor is configured to execute instructions, including instructions for a process for managing metadata entries related to a base volume. According to the third aspect, the process includes accessing a first top level entry of a first table of the base volume having at least a first bottom level entry. The process also includes receiving a first request for a metadata snapshot of the base volume, including the first bottom level entry. The process also includes generating a second top level entry of the first table, the second top level entry configured to point to the at least first bottom level entry of the first table, the second top level entry configured to operate as a first snapshot of the first table including the at least first bottom level entry.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

A duplication of bottom level entries, also referred to as bottom level page table entries (BLPTEs) typically occurs during the production or generation of metadata snapshots for metadata management of a top level entry, also referred to as a top level page table entry (TLPTE), the base volume.

In essence, in preferable embodiments of the present invention, disclosed are methods and systems that operate to avoid this duplication, instead simply pointing to the existing BLPTEs, except when necessary to reflect a change in the particular base volume. This reduces the consumption of BLPTE metadata at the disk level by limiting the number of snapshots of a volume, and the amount of metadata space each (metadata) snapshot consumes.

In various embodiments described with reference to this disclosure, various BLPTEs and/or TLPTEs can be generated (e.g., caused to be created or instantiated). Also with reference to various embodiments, various BLPTEs and/or TLPTEs can be copied or duplicated, in which a particular entry (or collection of entries) is read and an identical or substantially identical copy of the entry is produced and caused to be stored in a storage medium, such as an electronic storage medium. In yet other embodiments, references to copied entries or other data can be stored using or with metadata, and metadata can include an indication that a particular entry is an original, a copy, a copy of a copy, a modified original, or modified copy of an entry. Many variations of the presently disclosed embodiments are contemplated, although particular embodiments are presented herein with some embodiments omitted for clarity and/or brevity.

Figure 1:
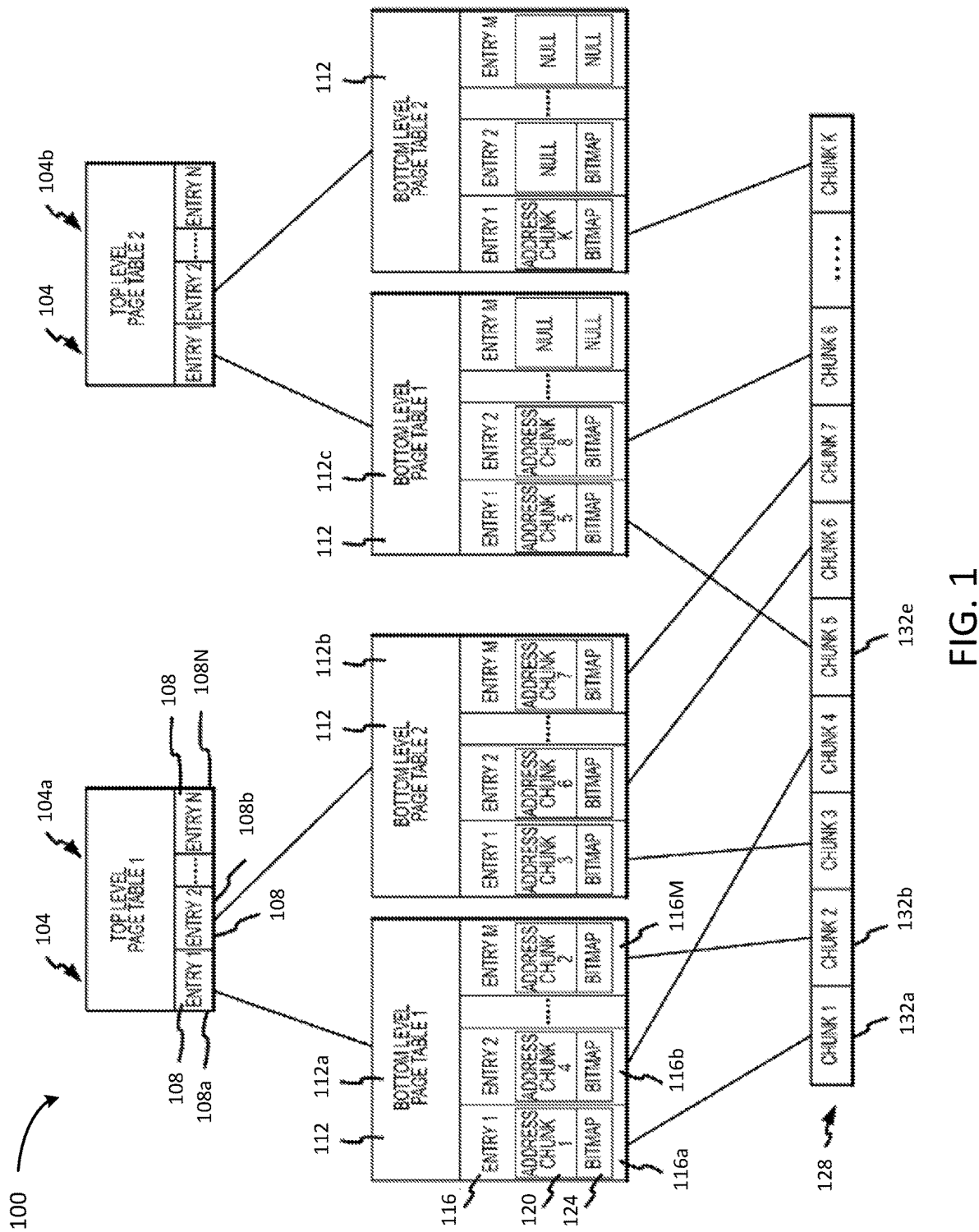
FIG. 1 is a data structure employed in association with the storage of snapshot data on a backing store, according to various embodiments.

FIG. 1 is a data structure 100 employed in association with the storage of snapshot data on a backing store, according to various embodiments.

A top level page table (TLPT) 104 is created when a snapshot is taken of a base or "master" data volume. A snapshot represents a point in time of the base volume when the snapshot is taken. A newer snapshot of the base volume is represented by the first TLPT 104a and an older snapshot of the same base volume is represented by the second TLPT 104b. In one embodiment, preserved base volume data is only copied to the newest snapshot when there is a write of data to the base volume. As a result of this, it is possible that the older snapshot represented by the second TLPT 104b does not contain a pointer or table entry for all data from the base volume at the time the older snapshot was taken. Rather, data stored on the base volume at the time the older snapshot was taken may be preserved in association with the first TLPT 104a if that data was not written until after the newer snapshot was taken. As can be appreciated, the number of TLPTs 104 stored depends upon the number of snapshots taken and the memory capacity of the backing store.

A TLPT 104 generally comprises a list of pointers, where each pointer points to a different bottom level page table (BLPT) 112. The pointers to each BLPT 112 are typically stored in the TLPT 104 as a TLPT entries (TLPTEs) 108. Each TLPTE 108 does not necessarily need to point to a BLPT, meaning that a TLPTE 108 can have a null value until additional snapshot data needs to be stored in association with the TLPT 104. Accordingly, when a snapshot of a base volume is taken, a TLPT 104 can be created with TLPTEs 108a-N, where N is typically greater than or equal to one. In one embodiment, upon creation of a snapshot, a TLPT 104 is created with a number of TLPTEs 108a-N. These TLPTEs 108a-N are initially empty (i.e., have a null value). Each TLPTE 108 corresponds to a BLPT 112 and therefore a range of BLPT entries (BLPTEs) 116. A structure of BLPTEs 116 are also created with each BLPTE 116 being reserved to point at a particular chunk 132 corresponding to a logical block address (LBA) on the base volume.

However, since data from the base volume is only written to the backing store when the base volume is being rewritten the BLPTEs 116 are initially null as well. As the operation of the base volume continues some of the TLPTEs 108a-N may eventually have pointers to BLPTs 112, whereas other TLPTEs 108a-N may be empty. A pointer included in a TLPTE 108 is generally stored as a memory address of the BLPT and generally has a size of about 4 bytes but can have a size of up to about 8 bytes. Although the TLPTEs 108a-N are shown being filled in order (i.e., the first TLPTE 108a is filled before the second TLPTE 108b which is filled before the N$^{th}$ TLPTE 108N), the order in which TLPTEs 108a-N are created or populated may be arbitrary.

A controller, such as controller 10 of FIG. 7, and described in greater detail below, can control the use of a hierarchical system of pointers to store snapshot data so that read and write commands for the snapshot data can be quickly and efficiently executed. As used herein, a pointer (or "metadata pointer"), can be a data entry that includes a TLPTE 108 and a BLPTE 116, and also includes some information with respect to at least one of the TLPTEs 108 or BLPTEs 116.

The BLPTs 112a-N contain pointers, stored as BLPTEs 116, that point to actual preserved data or write data for the snapshot associated with the corresponding TLPT 104. In one embodiment, each BLPTE 116a-M represents a range or "chunk" that comprises at least a subset of the snapshot data 132a-K on the backing store 128. An address chunk identifier 120 identifies the location of the corresponding chunk of data 132 on the backing store 128. A chunk 132 stores data that provides a moment in time picture of an LBA on the base volume. Therefore, two different chunks 132 can store data related to the same LBA but taken at different times.

Each chunk 132a-K may be further divided into sub-chunks via the use of a bitmap 124. The bitmap 124 information stored in the BLPTE 116 can be used to indicate where that sub-chunk is located within the chunk 132, either on the backing store 128 or on the base volume. In accordance with one embodiment, each chunk 132 corresponds to about 2 MB of memory and each sub-chunk corresponds to about 64 KB of memory. As can be appreciated by one skilled in the art, the chunk address identifiers 120 for each BLPTE 116 in a BLPT 112 does not need to be assigned to a chunk 132 consecutively as shown in FIG. 1. For example, the Mth BLPTE 116 of the first BLPT 104a could be allocated before first BIPTE 116 of the first BLPT 104a. However, in other embodiments, the BLPTEs 116 could be assigned chunks 132 consecutively to make assignment of chunks more orderly.

When a snapshot read command is received by the controller, the controller can quickly locate a portion of snapshot data by first identifying the TLPT 104 corresponding to the requested snapshot then drill down to the requested data using the pointers in the TLPT 104 and BLPT 112. If the controller (e.g., controller 10) determines that the data is not on the requested snapshot (e.g., 104b), the controller will search for a newer (e.g., second) snapshot (e.g., 104a). If the data is not on the newer snapshot (e.g., 404a), then the data will be on the base volume. However in one embodiment, when a newer snapshot is deleted, the controller will seek to assure that data which should be stored on an older snapshot but was stored on the snapshot being deleted is preserved in the older snapshot before the newer snapshot is deleted so that such data is not lost.

Although snapshot data is depicted and described having two levels of entries (i.e., top levels and bottom levels), it can be appreciated by one of skill in the art that a greater or lesser number of levels may be employed. For instance, several levels of entries may be utilized, but following similar techniques and structures described herein. Additionally, aspects of the present invention may be employed with different levels of indirect page tables.

Figure 2:
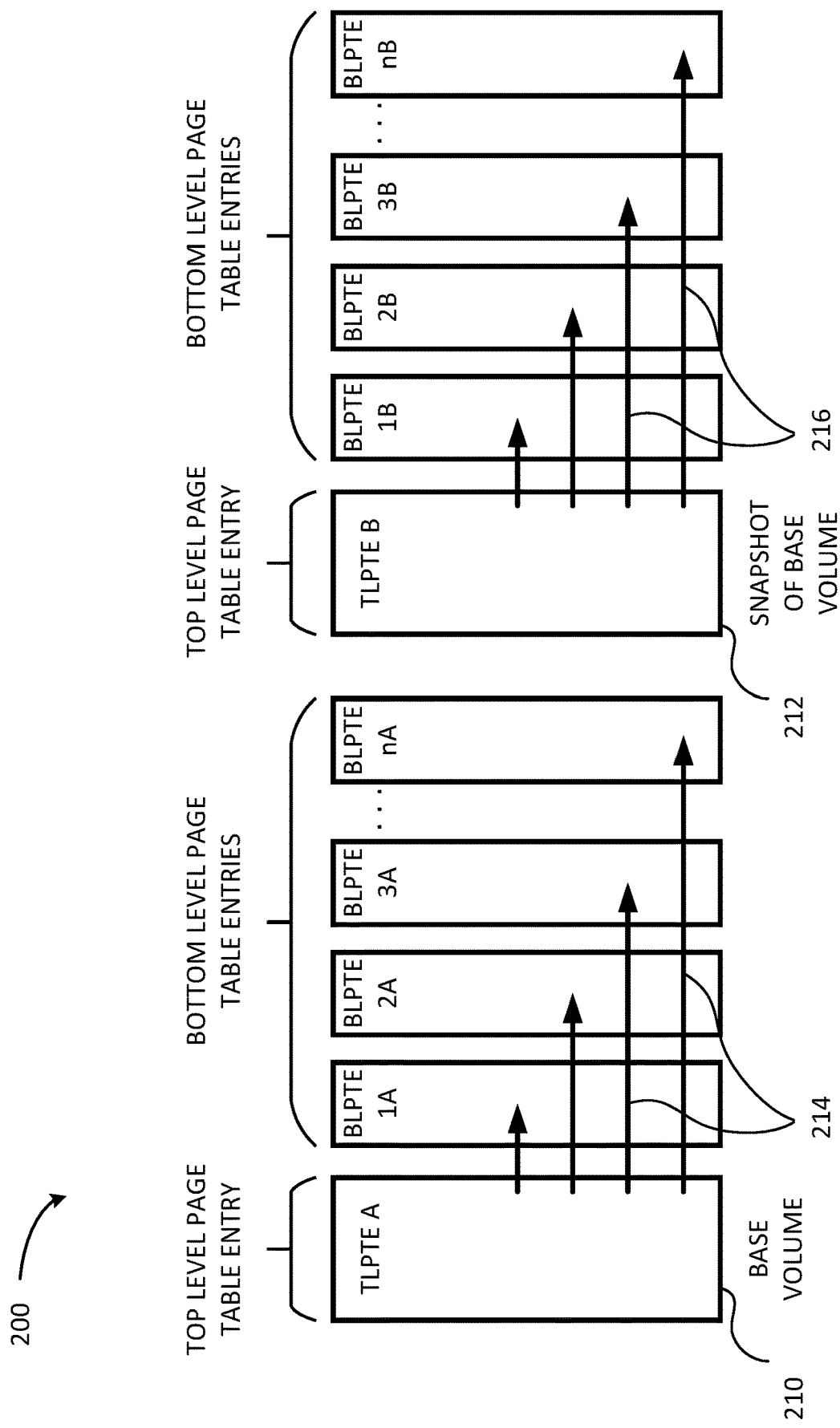
FIG. 2 is an illustrative diagram for taking a snapshot of a top level entry including bottom level entry metadata using a snapshot that redundantly copies bottom level entry metadata of the top level entry as a new top level entry with the same bottom level entry metadata, according to various embodiments.

FIG. 2 is an illustrative diagram 200 for taking a snapshot of a top level entry (TLPTE) including bottom level entry (BLPTE) metadata using a snapshot that redundantly copies BLPTE metadata of the TLPTE as a new, copy TLPTE with the same, but copied, BLPTE metadata.

The example diagram 200 can illustrate a metadata snapshot process. According to existing processes and with reference to diagram 200 of FIG. 2, a TLPTE A, a base volume, includes metadata pointers 214 to several BLPTEs 1A-nA. In order to take a snapshot of the base volume 210 and the BLPTEs, the existing process creates a second top level entry 212, as a snapshot of the base volume 210. According to diagram 200 of FIG. 2, the creation of snapshot 212 also creates copies of each and every one of BLPTEs 1A-nA as BLPTEs 1B-nB, which are stored separately from the BLPTEs 1A-nA, although at this moment BLPTEs 1B-nB include the same information as corresponding BLPTEs 1A-nA. In addition, metadata pointers 216 are created that point from the snapshot 212 to the copied BLPTEs 1B-nB.

Therefore, according to the above process, in order to produce a metadata snapshot 212 of base volume 210, the BLPTEs of the base volume 210 are copied during the creation of snapshot 212 regardless of the changes to the various BLPTEs during cache usage, until each of the BLPTEs are copied over as a unit.

Figure 3:
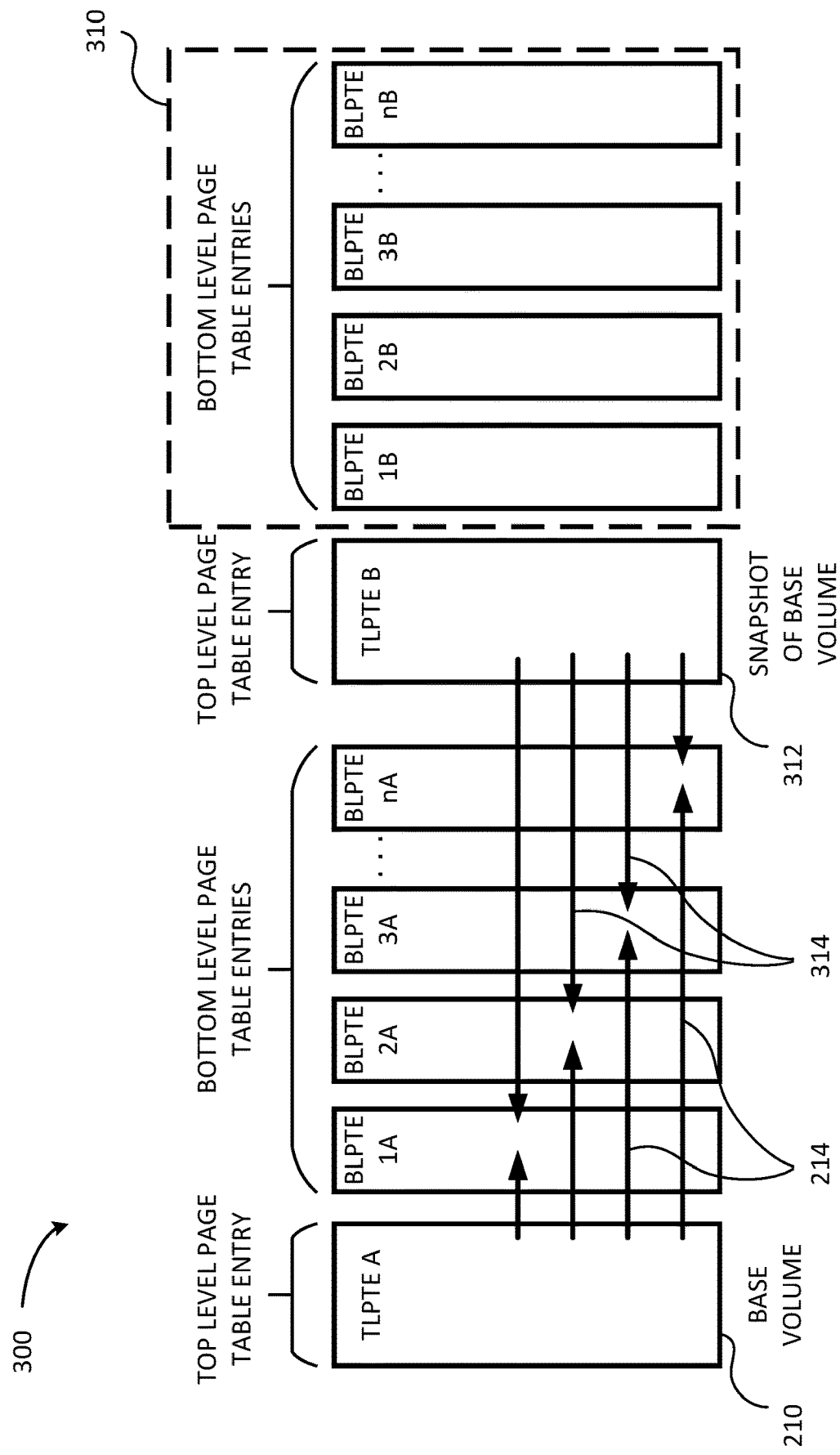
FIG. 3 is a diagram of a process for taking a snapshot of a base volume including bottom level entry metadata where the snapshot points to the existing bottom level entry metadata instead of copying the bottom level entry metadata redundantly, according to various embodiments.

FIG. 3 is a diagram of a process 300 for taking a snapshot of a base volume including BLPTE metadata where the snapshot points to the existing BLPTE metadata instead of copying the BLPTE metadata redundantly, according to various embodiments.

As a variation of the example process 200 of FIG. 2, an improved process 300 includes causing a snapshot 312 to be taken of the base volume 210, including the base volume's BLPTEs. Instead of copying BLPTEs 1A-nA of the base volume 310, according to process 300, the snapshot 312 instead includes metadata pointers 314 that point to the same BLPTEs 1A-nA that exist with reference to the base volume 210.

Process 300 can start by receiving or creating a first TLPTE 210 as a base volume that includes metadata entries for each of BLPTEs 1A-nA. Next, a snapshot 312 is taken of the same base volume 210, as a second TLPTE, where the snapshot 212 points to each of existing BLPTEs 1A-nA, but during this process, the BLPTEs 1A-nA may not be duplicated. Instead, the snapshot 312 can point to the existing BLPTEs 1A-nA only. Note that BLPTEs shown at 310 are neither pointed to by TLPTE B in the snapshot of TLPTE B (base volume) 212, nor are they stored within metadata of a cache, as shown in the present embodiment.

Figure 4:
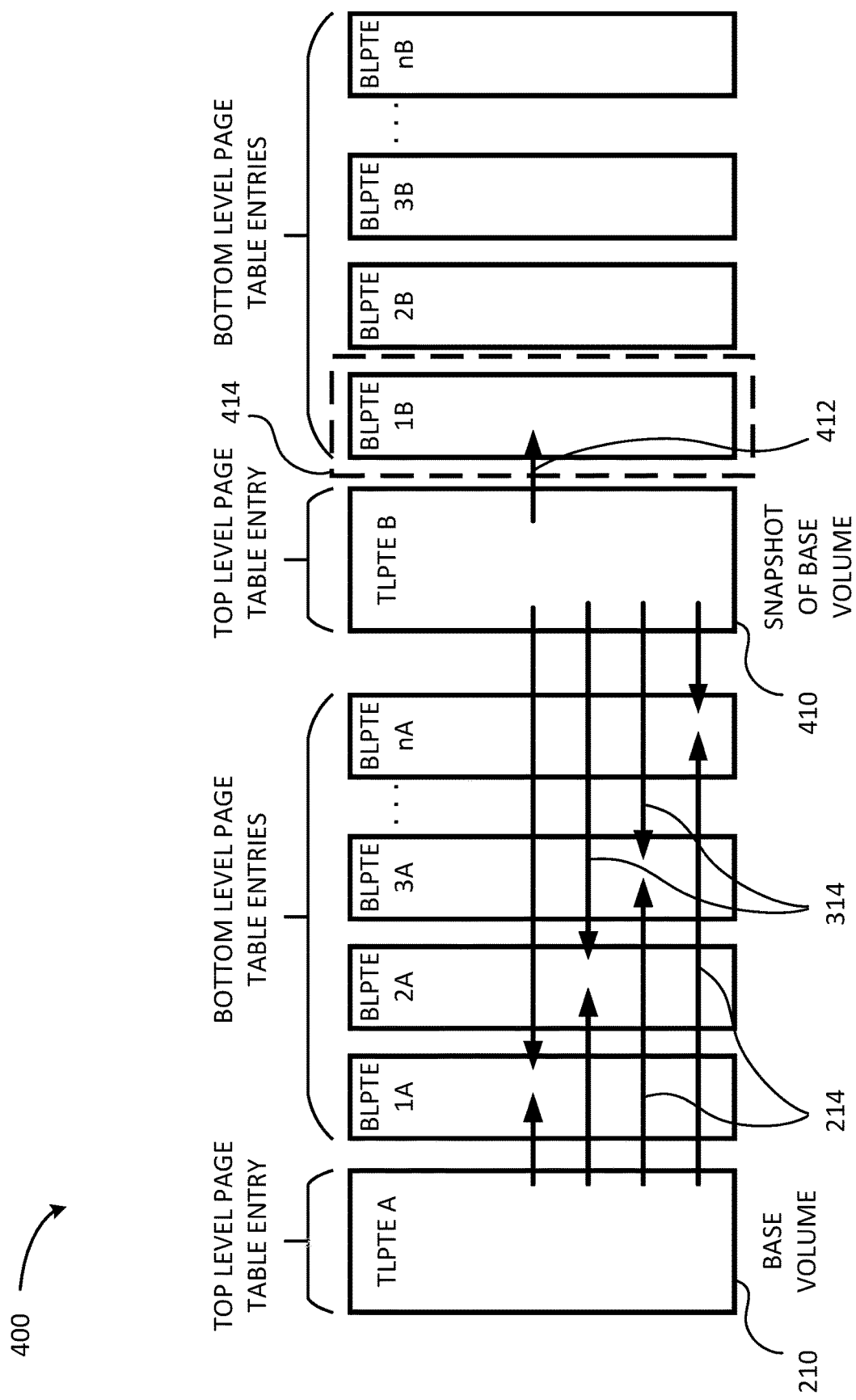
FIG. 4 illustrates a diagram of a process where a change is made or detected to at least one bottom level entry of FIG. 3, according to various embodiments.

FIG. 4 illustrates a diagram of a process 400 where a change is made or detected to at least one BLPTE of process 300 of FIG. 3, according to various embodiments.

According to FIG. 4, a change is made to a BLPTE upon which a snapshot of base volume at 410 is updated to contain the update to relevant metadata according to the change to the BLPTE. As shown, a change or modification (e.g., a write operation, or in some cases a read operation) is made to BLPTE 1A, such that BLPTE 1A becomes new BLPTE 1B at 414. After the modification to the BLPTE 1 is made, then and only then is the storage space corresponding to the changed BLPTE, now BLPTE 1B, duplicated and modified for use with snapshot 410 of the base volume 210. In some embodiments, a change to a BLPTE can include an access to the BLPTE without changing the data stored within the BLPTE. Furthermore, in some cases, merely accessing or reading a BLPTE can include writing metadata that corresponds to the read (or other access) operation.

According to process 400 of FIG. 4, a new metadata pointer 412 is created upon the update of the snapshot from snapshot 312 to snapshot 410 when the change is made at BLPTE 1B (which can correspond to previous BLPTE 1A). As shown, metadata pointer 412 points from the snapshot volume 410 to the modified BLPTE 1B, but in other embodiments, a pointer instead points from base volume 210 to BLPTE 1B at 414. Several aspects of process 400 are similar to those of process 300 of FIG. 3. It is noted that the change to BLPTE 1B is chosen at 414 as an example for illustrative purposes only, and one or more BLPTEs either other than BLPTE 1B or including but in addition to, could be modified and corresponding updates to snapshot 410, including different or additional metadata pointer 412 could be employed. However, for simplicity, only a modification to BLPTE 1B at 414 is shown, with corresponding new metadata pointer 412.

As shown with reference to diagram 400, even after the modification is made to BLPTE 1B, the new, e.g., second, snapshot 410 of the base volume 210 still uses (or copies) only one of the BLTPEs 1B-nB. As shown, the metadata pointer 412 is created that points from TLPTE B 410 (snapshot of base volume) to BLPTE 1B 414 (the modified BLPTE), as shown.

In various alternative embodiments, the new metadata pointer 412 can instead be created in order point from TLPTE B 410 to any other modified BLPTE 1B-nB when the second snapshot is created following the modification of BLPTE 1A that becomes BLPTE 1B, and so forth. This is in contrast to the example shown with respect to FIG. 2, where each and every one of example BLPTEs 1B-nB would be in use whenever a snapshot of the TLPTE A (base volume) 210 was taken or otherwise caused to be taken. After the modification of BLPTE 1A to become BLPTE 1B, BLPTE 1A may still be stored within TLPTE A 210 for a time, as suitable.

Figure 5:
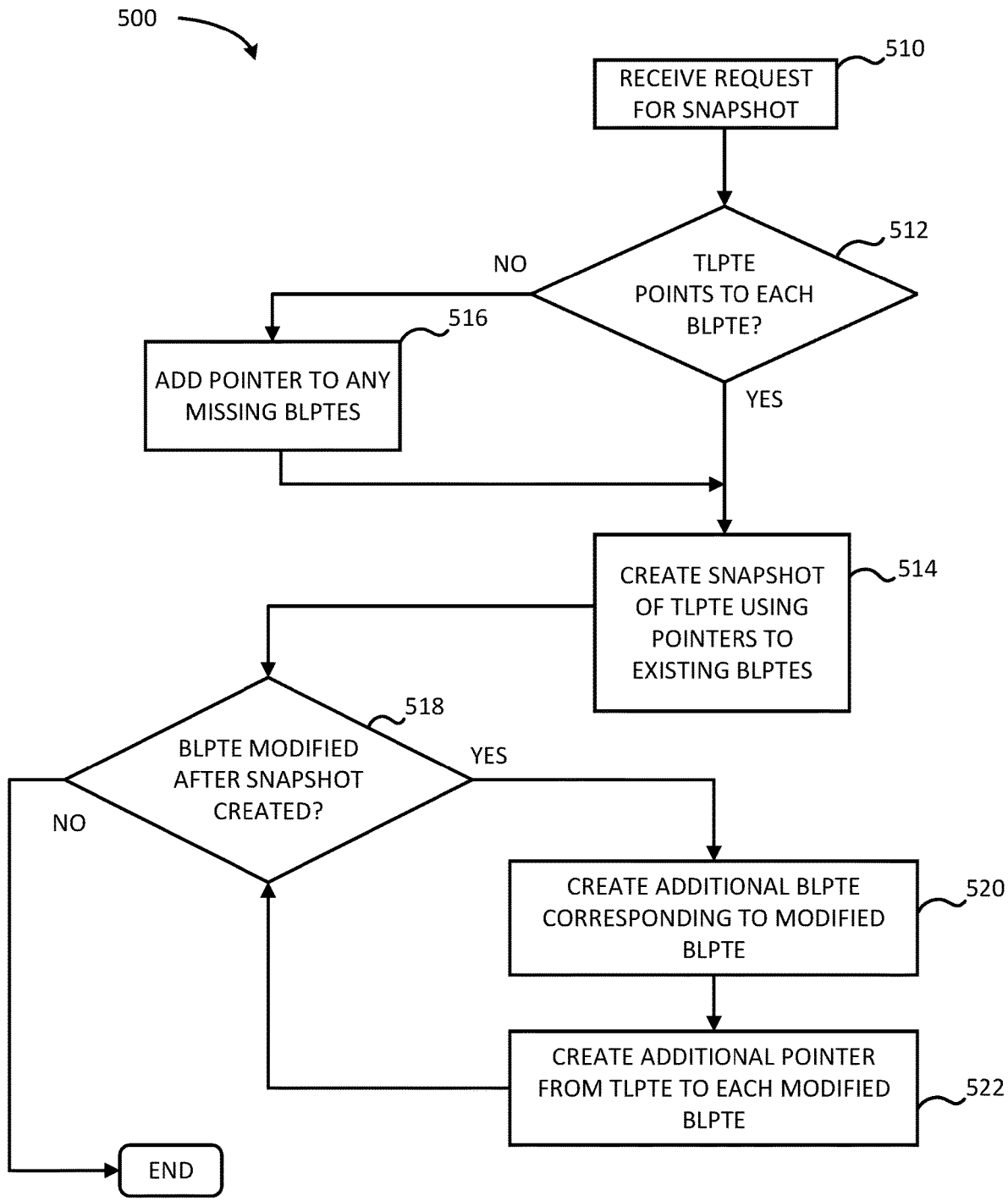
FIG. 5 is a flowchart of a process for metadata management, according to various embodiments.

FIG. 5 is a flowchart of a process 500 for metadata management, according to various embodiments.

According to FIG. 5, a process 500 can begin by receiving a request for a snapshot of a first table having at least a first TLPTE having a first BLPT that includes BLPTEs at operation 510. At operation 512, it can be determined whether the TLPTE has a metadata pointer to each corresponding BLPTE. If it is determined at operation 512 that the TLPTE does not have a metadata pointer to each corresponding BLPTE, the process can proceed to operation 516. At operation 516, if it has been determined that the TLPTE does not have a metadata pointer to each corresponding BLPTE, a pointer can be added from the TLPTE to any missing BLPTEs. Following operation 516, the process can proceed to operation 514. If at operation 512 it is determined that the TLPTE has a pointer to each corresponding BLPTE, the process can proceed directly to operation 514.

At operation 514, a snapshot can be created or "taken" of the TLPTE using points to existing BLPTE, and including a new TLPTE. Taking a snapshot can include causing a new TLPTE to be created that includes pointers to each BLPTE or a copy thereof, as discussed herein. Following operation 514, at operation 518 it can be determined whether a BLPTE has been modified after the snapshot was created. If it is determined at operation 518 that no BLPTE has been modified after the snapshot was created, the process may end. However, if it is determined at operation 518 that a BLPTE has been modified after the snapshot was created, the process can proceed to operation 520. The determining at operation 518 that a BLPTE has been modified can include determining if a write I/O operation has transmitted or otherwise shared data in response to the modification operation. If sure write I/O operation does transmit data, then a controller (e.g., controller 10) may know that a particular BLPTE is modified. The determining at operation 518 can be received from a controller, such as controller 10 of FIG. 7, or various other computer or input commands.

At operation 520, an additional BLPTE is created that corresponds to the modified BLPTE. Following operation 520, at operation 522, an additional metadata pointer can be created that points from the TLPTE to each modified BLPTE. At operations 520 and 522, the created, corresponding BLPTE and the additional metadata pointer can be added to the snapshot created at operation 514.

Following operation 522, the process 500 can return to operation 518, where the process may optionally repeat operations 520 and 522. The process may instead end. Although the operations of process 500 are presented in one or more particular orders, the various operations should not be construed to be limited to the process ordering as shown and described. Furthermore, additional, fewer, or different operations can be included or omitted in variations of the process 500 according to this disclosure.

Figure 6:
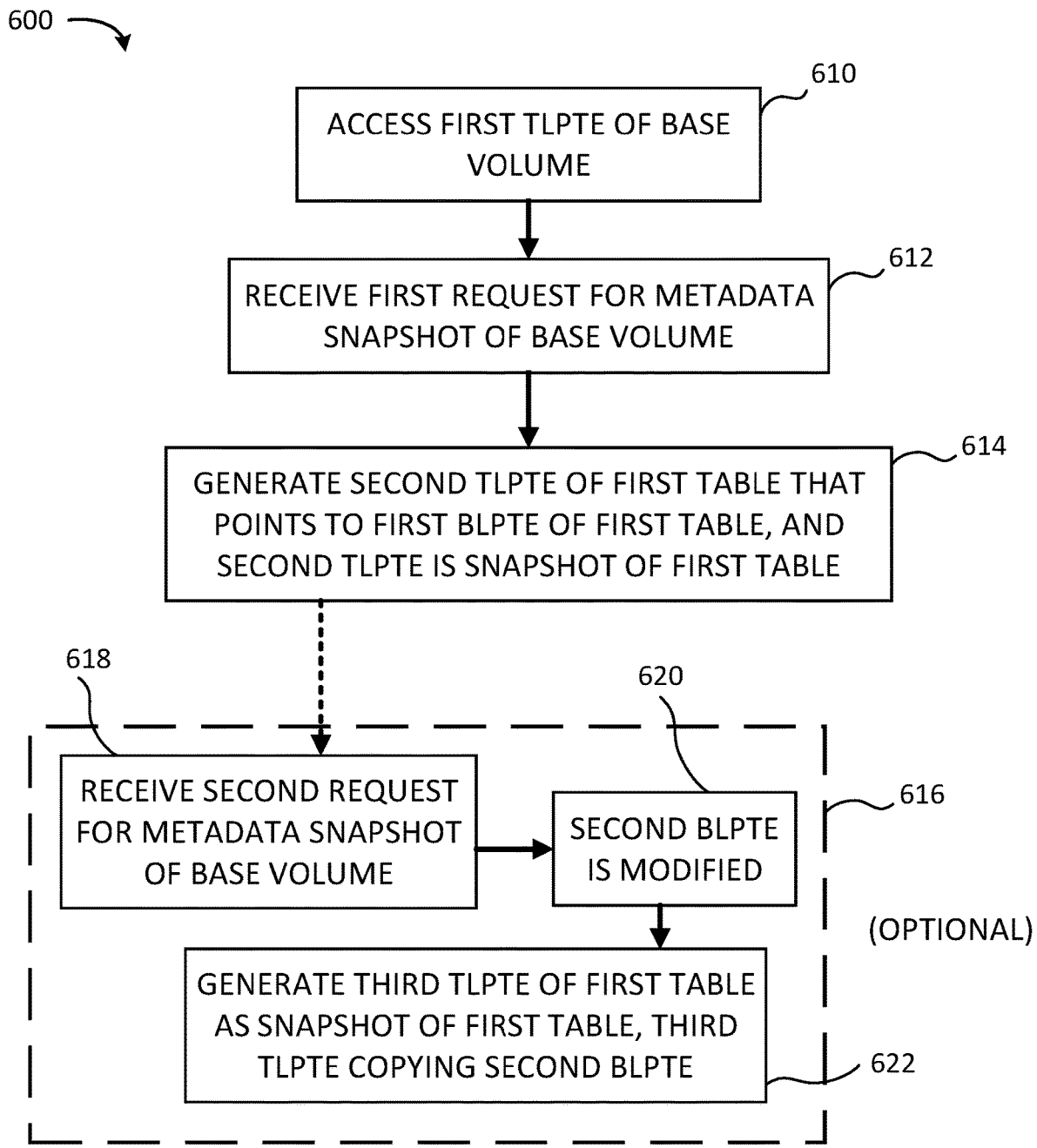
FIG. 6 is a flowchart of another process for metadata management, according to various embodiments.

FIG. 6 is a flowchart of another process 600 for metadata management, according to various embodiments.

According to FIG. 6, a process 600 can begin at operation 610 by accessing a first TLPTE of a base volume having at least a first BLPTE. The first TLPTE, and optionally other TLPTEs, can be comprised within a first top level page table (e.g., 104 of FIG. 1). At operation 612, a first request for a metadata snapshot of the base volume is received, including at least a first BLPTE. Next, at operation 614, a second TLPTE is generated of the first table, where the second TLPTE is configured to point to the at least first BLPTE of the first table, and the second TLPTE is configured to operate as a snapshot of the first table, including the at least first BLPTE.

Following operation 614, process 600 can optionally proceed to optional operations shown at 616, which can include operations 618, 620, and/or operation 622. Optional operations 616 are described below.

Process 600 can proceed to operation 618 of optional operations 616. At operation 618, a second request for a metadata snapshot of the base volume is received, including a second BLPTE. The, at operation 620 of optional operations 616, an indication that the second BLPTE has been modified is received. Next, at operation 622 of optional operations 616, a third TLPTE of the first table can be generated in response to the receiving the second request and the indication. At operation 622, the third TLPTE can be configured to operate as a snapshot of the first table, including at least the second BLPTE, and the third TLPTE operates to copy the second BLPTE to be stored in association with the third TLPTE.

Although the operations of process 600 are presented in one or more particular orders, the various operations should not be construed to be limited to the process ordering as shown and described. Furthermore, additional, fewer, or different operations can be included or omitted in variations of the process 600 according to this disclosure.

Figure 7:
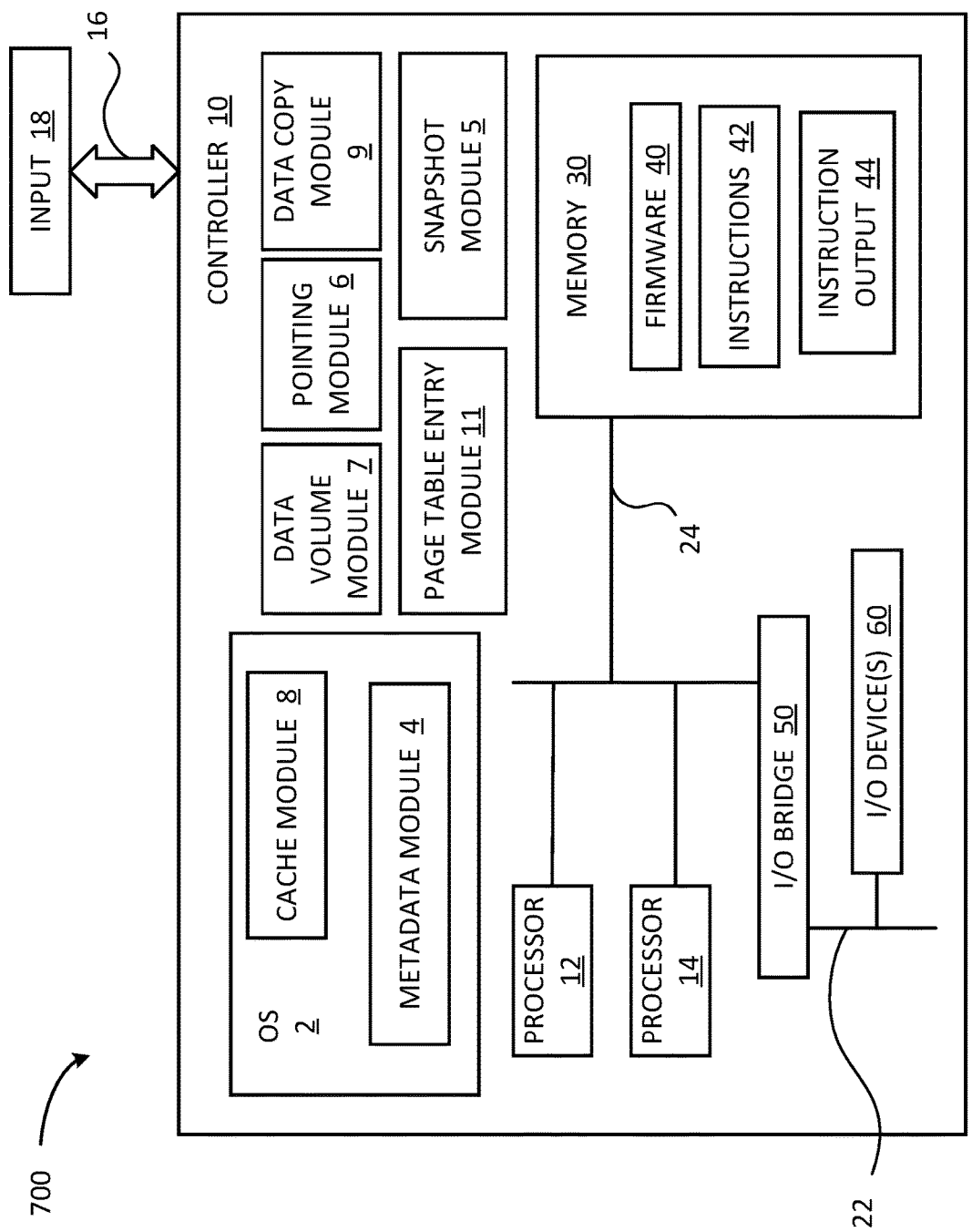
FIG. 7 is a block schematic diagram of a computer system according to embodiments of the present disclosure.

FIG. 7 is a block schematic diagram of a computer system 700 according to embodiments of the present disclosure.

Computer system 700, as shown, is configured with an interface 16 to enable a controller 10 to receive a request to efficiently manage cache metadata. The controller can be configured to perform processes 500 and/or 600 in various embodiments. The controller 10 may be in communication with one or more cache or through a cache module 8, and with various physical or virtual metadata through metadata module 4, according to various embodiments. The cache module 8 and the metadata module 4 can be stored on or with operating system (OS) 2, which may be configured to control metadata management and activity. The controller 10 may also facilitate implementation and performance of various other methods or processes, as described herein. The controller 10 may include various computing components, including a central processing unit in processors 12, 14, memory 30, storage components, and be include an OS 2 and/or firmware installed thereon. The various components of the controller 10 may be operatively or electrically connected to one another, and input/output device may be configured to interface with the controller 10 as described in more detail, below.

An input 18 may be received at interface 16. In embodiments, the interface 16 can enable controller 10 to receive, or otherwise access, the input 18 via, for example, a network (e.g., an intranet, or a public network such as the Internet), or a storage medium, such as a hard-disk drive internal or connected to controller 10. The interface 16 can be configured for human input or other input devices 60. It would be apparent to one of skill in the art that the interface can be any of a variety of interface types or mechanisms suitable for a computer, or a program operating in a computer, to receive or otherwise access or receive a source input or file.

Processors 12, 14 included in controller 10 are connected by a memory interface 24 to memory device or module 30. In embodiments, the memory 30 can be a cache memory, a main memory, a flash memory, or a combination of these or other varieties of electronic devices capable of storing information and, optionally, making the information, or locations storing the information within the memory 30, accessible to one or more processor 12, 14. Memory 30 can be formed of a single electronic (or, in some embodiments, other technologies such as optical) module or can be formed of a plurality of memory devices. Memory 30, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 700 can include a plurality of memory devices. A memory interface, such as 24, between a one or more processors 12, 14 and one or more memory devices can be, for example, a memory bus common to one or more processors and one or more memory devices. In some embodiments, a memory interface, such as 24, between a processor (e.g., 12, 14) and a memory 30 can be point to point connection between the processor and the memory, and each processor in the computer 700 can have a point-to-point connection to each of one or more of the memory devices. In other embodiments, a processor (e.g., 12) can be connected to a memory (e.g., memory 30) by means of a connection (not shown) to another processor (e.g., 14) connected to the memory (e.g., 24 from processor 12 to memory 30).

Computer 700 can include an input/output (I/O) bridge 50, which can be connected to a memory interface 24, or to processors 12, 14. An I/O bridge 50 can interface the processors 12, 14 and/or memory devices 30 of the computer 700 (or, other I/O devices) to I/O devices 60 connected to the bridge 50. For example, controller 10 includes I/O bridge 50 interfacing memory interface 24 to I/O devices, such as I/O device 60. In some embodiments, an I/O bridge 50 can connect directly to a processor or a memory, or can be a component included in a processor or a memory. An I/O bridge 50 can be, for example, a peripheral component interconnect express (PCI-Express) or other I/O bus bridge, or can be an I/O adapter.

An I/O bridge 50 can connect to I/O devices 60 through an I/O interface, or I/O bus, such as I/O bus 22 of controller 10. For example, I/O bus 22 can be a PCI-Express or other I/O bus. I/O devices 60 can be any of a variety of peripheral I/O devices or I/O adapters connecting to peripheral I/O devices. For example, I/O device 60 can be a graphics card, keyboard or other input device, a hard-disk drive, solid-state drive (SSD) or other storage device, a network interface card (MC), etc. I/O devices 60 can include an I/O adapter, such as a PCI-Express adapter, that connects components (e.g., processors or memory devices) of the computer 700 to various I/O devices 60 (e.g., disk drives, Ethernet networks, video displays, keyboards, mice, styli, touchscreens, etc.).

Computer 700 can include instructions 42 executable by one or more of the processors 12, 14 (or, processing elements, such as threads of a processor). The instructions 42 can be a component of one or more programs. The programs, or the instructions 42, can be stored in, and/or utilize, one or more memory devices of computer 700. Memory 30 can also store one or more instruction output 44. As illustrated in the example of FIG. 7, controller 10 includes a plurality of programs or modules, such as cache module 8, metadata module 4, data volume module 7, pointing module 6, data copy module 9, page table entry module 11, and snapshot module 5. A program can be, for example, an application program, an operating system (OS) or a function of an OS, or a utility or built-in function of the computer 700. A program can be a hypervisor, and the hypervisor can, for example, manage sharing resources of the computer 700 (e.g., a processor or regions of a memory, or access to an I/O device) among a plurality of programs or OSes.

Programs can be "stand-alone" programs that execute on processors and use memory within the computer 700 directly, without needing another program to control their execution or their use of resources of the computer 700. For example, controller 10 includes (optionally) stand-alone programs in cache module 8, metadata module 4, data volume module 7, pointing module 6, data copy module 9, page table entry module 11, and snapshot module 5. A stand-alone program can perform particular functions within the computer 700, such as controlling, or interfacing (e.g., access by other programs) an I/O interface or I/O device. A stand-alone program can, for example, manage the operation, or access to, a memory (e.g., memory 30). A basic I/O subsystem (BIOS), or a computer boot program (e.g., a program that can load and initiate execution of other programs) can be a stand-alone program.

Controller 10 within computer 700 can include one or more OS 2, and an OS 2 can control the execution of other programs such as, for example, to start or stop a program, or to manage resources of the computer 700 used by a program. For example, controller 10 includes OS 2, which can include, or manage execution of, one or more programs, such as OS 2 including (or, managing) cache module 8 and/or metadata module 4. In some embodiments, an OS 2 can function as a hypervisor.

A program can be embodied as firmware (e.g., BIOS in a desktop computer, or a hypervisor) and the firmware can execute on one or more processors and, optionally, can use memory, included in the computer 700. Firmware can be stored in a memory (e.g., a flash memory) of the computer 700. For example, controller 10 includes firmware 40 stored in memory 30. In other embodiments, firmware can be embodied as instructions (e.g., comprising a computer program product) on a storage medium (e.g., a CD-ROM, DVD-ROM, flash memory, or hard-disk drive), and the computer 700 can access the instructions from the storage medium.

In embodiments of the present disclosure, the computer 700 can include instructions for efficiently managing cache entries and operations. Controller 10 includes, for example, data volume module 7, pointing module 6, data copy module 9, page table entry module 11, and snapshot module 5, which can operate, in conjunction with cache module 8 and/or metadata module 4, to efficiently manage cache entries and operations. The computer 700 can utilize cache module 8 and metadata module 4, in a memory 30 of the computer 700, such as controller 10 storing the various cache and disk data, and perform efficient cache management and/or cache I/O operations in memory 30.

The example computer system 700 and controller 10 are not intended to limiting to embodiments. In embodiments, computer system 700 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, the controller 10 can be, for example, a computing device having a processor (e.g., 12) capable of executing computing instructions and, optionally, a memory 30 in communication with the processor. For example, controller 10 can be a desktop or laptop computer; a tablet computer, mobile computing device, personal digital assistant (PDA), or cellular phone; or, a server computer, a high-performance computer (HPC), or a super computer. Controller 10 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of managing metadata entries related to a base volume, comprising:

accessing a first top level entry of a first table of the base volume, the first top level entry having at least a first bottom level entry;

receiving a first request for a metadata snapshot of the base volume, including the first bottom level entry; and generating a second top level entry of the first table, the second top level entry configured to point to the at least first bottom level entry of the first table, and the second top level entry configured to operate as a first snapshot of the first table including the at least first bottom level entry.

2. The method of claim 1, further comprising:

receiving a second request for a metadata snapshot of the base volume, including a second bottom level entry;

receiving an indication that the second bottom level entry has been modified; and in response to the receiving the second request and the indication, generating a third top level entry of the first table, the third top level entry configured to operate as a second snapshot of the first table including at least the second bottom level entry, wherein the third top level entry operates to copy to the second bottom level entry to be stored in association with the third top level entry, and wherein the third top level entry is configured to point to the copy of the second bottom level entry.

3. The method of claim 2, wherein the receiving the indication that the second bottom level entry has been modified is received after the second top level entry of the first table is generated.

4. The method of claim 1, wherein the generating the second top level entry of the first table does not involve copying the first bottom level entry.

5. The method of claim 1, wherein the second top level entry pointing to the at least first bottom level entry of the first table includes a metadata entry stored within the second top level entry and the metadata entry includes a reference to the at least first bottom level entry of the first table.

6. The method of claim 1, wherein the first top level entry is a top level page table entry, and wherein the first bottom level entry is a bottom level page table entry.

7. A method of managing metadata entries, comprising:
accessing a first top level entry of a first table, the first top level entry having at least a first bottom level entry;
receiving a first request for a metadata snapshot of a base volume, including the first bottom level entry;
receiving an indication that the first bottom level entry has been modified; and
generating a second top level entry of the first table, the second top level entry configured to operate as a first snapshot of the first table including at least the first bottom level entry, the second top level entry operating to copy and the first bottom level entry to be stored in association with the second top level entry.

8. The method of claim 7, wherein the third top level entry is configured to point to the copy of the first bottom level entry stored in association with the second top level entry.

9. The method of claim 8, wherein the third top level entry is configured to store a metadata entry, and wherein the metadata entry includes a reference to the copy of the first bottom level entry.

10. The method of claim 7, wherein the first table is stored within the base volume.

11. The method of claim 7, wherein the first top level entry is a top level page table entry, and wherein the first bottom level entry is a bottom level page table entry.

12. The method of claim 7, wherein the receiving the indication that the first bottom level entry has been modified is received in response to a modification of the first bottom level entry that includes a modification operation selected from the group consisting of: a read operation or a write operation of the first bottom level entry.

13. The method of claim 7, wherein the generating the second top level entry of the first table is generated in response to the receiving the first request and the indication.

14. A system, comprising:
a hardware processor operatively coupled to a storage device;
the hardware processor configured to execute instructions, including instructions for a process for managing metadata entries related to a base volume, the process comprising:
accessing a first top level entry of a first table of the base volume having at least a first bottom level entry;
receiving a first request for a metadata snapshot of the base volume, including the first bottom level entry; and
generating a second top level entry of the first table, the second top level entry configured to point to the at least first bottom level entry of the first table, the second top level entry configured to operate as a first snapshot of the first table including the at least first bottom level entry.

15. The system of claim 14, wherein the process, when the instructions are executed, further comprises:
receiving a second request for a metadata snapshot of the base volume, including a second bottom level entry;
receiving an indication that the second bottom level entry has been modified; and
in response to the receiving the second request and the indication, generating a third top level entry of the first table, the third top level entry configured to operate as a second snapshot of the first table including at least the second bottom level entry, and wherein the third top level entry operates to copy the second bottom level entry to be stored in association with the third top level entry.

16. The system of claim 15, wherein the receiving the indication that the second bottom level entry has been modified is received after the second top level entry of the first table is generated.

17. The system of claim 15, wherein the receiving the indication that the second bottom level entry has been modified is received in response to a modification of the second bottom level entry that includes a modification operation selected from the group consisting of: a read operation or a write operation of the second bottom level entry.

18. The system of claim 14, wherein the generating the second top level entry of the first table does not involve copying the first bottom level entry.

19. The system of claim 14, wherein the second top level entry pointing to the at least first bottom level entry of the first table includes a metadata entry stored within the second top level entry and the metadata entry includes a reference to the at least first bottom level entry of the first table.

20. The system of claim 14, wherein the first top level entry is a top level page table entry, and wherein the first bottom level entry is a bottom level page table entry.

* * * * *

UNITED STATES PATENT AND TRADEMARK OFFICE
CERTIFICATE OF CORRECTION

PATENT NO. : 10,534,751 B1
APPLICATION NO. : 16/127372
DATED : January 14, 2020
INVENTOR(S) : Gomathirajan Authoor Velayuthaperumal Page 1 of 1

It is certified that error appears in the above-identified patent and that said Letters Patent is hereby corrected as shown below:

In the Claims

<u>Column 11</u>

Claim 7, Line 33, delete "and".

Claim 8, Line 35, delete "third" and insert in place thereof --second--.

Claim 9, Line 38, delete "third" and insert in place thereof --second--.

Signed and Sealed this
Tenth Day of March, 2020

Andrei Iancu
*Director of the United States Patent and Trademark Office*